United States Patent
Fardi (10) Patent No.: US 8,126,210 B2
(45) Date of Patent: Feb. 28, 2012

(54) VEHICLE PERIPHERY MONITORING DEVICE, VEHICLE PERIPHERY MONITORING PROGRAM, AND VEHICLE PERIPHERY MONITORING METHOD

(75) Inventor: Basel Fardi, Chemnitz (DE)

(73) Assignee: Honda Motor Co., Ltd., Tokyo (JP)

( * ) Notice: Subject to any disclaimer, the term of this patent is extended or adjusted under 35 U.S.C. 154(b) by 377 days.

(21) Appl. No.: 12/450,587

(22) PCT Filed: Apr. 27, 2007

(86) PCT No.: PCT/JP2007/059223
§ 371 (c)(1),
(2), (4) Date: Oct. 1, 2009

(87) PCT Pub. No.: WO2008/139529
PCT Pub. Date: Nov. 20, 2008

(65) Prior Publication Data
US 2010/0104138 A1   Apr. 29, 2010

(51) Int. Cl.
*G06K 9/00* (2006.01)
*H04N 7/18* (2006.01)

(52) U.S. Cl. ......... 382/106; 382/103; 382/104; 348/148

(58) Field of Classification Search ............... 382/100, 382/103–107, 115, 190, 156, 312, 232; 340/442, 340/447, 467; 342/70, 75, 77, 158, 359; 343/712; 348/148, 238; 701/44, 45, 49, 701/59, 29; 702/155–156, 166; 706/15, 706/20

See application file for complete search history.

(56) References Cited

U.S. PATENT DOCUMENTS
5,633,705 A   5/1997   Asayama
(Continued)

FOREIGN PATENT DOCUMENTS
EP   1 580 075 A2   9/2005
(Continued)

OTHER PUBLICATIONS

Broggi, A, et al., "Shape-based Pedestrian Detection", Intelligent Vehicles Symposium, 2000. IV 2000. Proceedings of the IEEE Dearborn, MI, USA Oct. 3-5, 2000 Piscataway, NJ, USA, IEEE, US, Oct. 3, 2000, pp. 215-220, XP010528939, ISBN 978-0/7803-6363-2.

(Continued)

*Primary Examiner* — Samir Ahmed
*Assistant Examiner* — Mehdi Rashidian
(74) *Attorney, Agent, or Firm* — Carrier Blackman & Associates, P.C.; Joseph P. Carrier; William D. Blackman (57) ABSTRACT

A vehicle periphery monitoring device is provided with an image processing target area setting portion for setting an image processing target area (61) that may include an image portion of an monitoring object in a captured image (Im2) on the basis of a distance between an object and a vehicle; a feature region extracting portion for extracting a feature region with a feature amount of a head of a pedestrian in a search area (64) based on the image processing target area (61); an image processing target area correcting portion for correcting a range of the image processing target area from (61) to (62) on the basis of the position of a feature region (60*a*), and an object type discriminating portion for discriminating a type of real space monitoring object corresponding to the image portion included in the corrected image processing target area (62).

11 Claims, 9 Drawing Sheets

U.S. PATENT DOCUMENTS

| | | | |
|---|---|---|---|
| 5,809,161 A * | 9/1998 | Auty et al. | 382/104 |
| 7,176,830 B2 | 2/2007 | Horibe | |
| 7,358,889 B2 | 4/2008 | Abe et al. | |
| 7,421,321 B2 * | 9/2008 | Breed et al. | 701/29 |
| 7,522,747 B2 | 4/2009 | Horibe | |
| 8,031,062 B2 * | 10/2011 | Smith | 340/438 |
| 2002/0080425 A1 | 6/2002 | Itokawa | |
| 2004/0143380 A1 * | 7/2004 | Stam et al. | 701/36 |
| 2006/0115115 A1 | 6/2006 | Nagaoka et al. | |
| 2009/0016609 A1 * | 1/2009 | Zakrzewski et al. | 382/190 |
| 2009/0092284 A1 * | 4/2009 | Breed et al. | 382/103 |

FOREIGN PATENT DOCUMENTS

| | | |
|---|---|---|
| EP | 1 666 919 A2 | 6/2006 |
| GB | 2 289 816 A | 11/1995 |
| JP | 06-139355 | 5/1994 |
| JP | 7-125567 | 5/1995 |
| JP | 08-161498 | 6/1996 |
| JP | 10-295679 | 11/1998 |
| JP | 2001-006096 | 1/2001 |
| JP | 2001-266158 | 9/2001 |
| JP | 2003-070742 | 3/2003 |
| JP | 2003-302470 | 10/2003 |
| JP | 3515926 | 4/2004 |
| JP | 2005-115618 | 4/2005 |
| JP | 2005-149145 | 6/2005 |
| JP | 2005-316701 | 11/2005 |
| JP | 2006-151125 | 6/2006 |
| JP | 2006-185433 | 7/2006 |
| JP | 2006-236255 | 9/2006 |
| JP | 2007-020064 | 1/2007 |
| WO | 2005/024464 A1 | 3/2005 |

OTHER PUBLICATIONS

Fardi, Basel et al., "Shape and Motion-based Pedestrian Detection in Infrared Images: A Multi Sensor Approach", Intelligent Vehicles Symposium, 2005. Proceedings. IEEE Las Vegas, NV USA, Jun. 6-8, 2005, Piscataway, NJ, USA, IEEE, Piscataway, NJ, USA LNKD-DOI:10.1109/IVS.2005.1505071, Jun. 6, 2005, pp. 18-23, XP010833936; ISBN: 978-0-7803-8961-8.

Xu, C et al., "Snakes, Shapes and Gradient Vector Flow", IEEE Transactions on Image Processing, IEEE Service Center, Piscataway, NJ, US LNKD-DOI:10.1109/83.661186, vol. 7, No. 3, Mar. 1998, pp. 359-369, XP002244153, ISSN:1057-7149.

Jierong Cheng et al., "Directional Gradient Vector Flow for Snakes", Signal Processing and Information Technology, 2004. Proceedings of the Fourth IEEE International Symposium on Rome, Italy Dec. 18-21, 2004, Piscataway, NJ, USA, IEEE LNKD- DOI:10.1109/ISSPIT.2004.1433748, Dec. 18, 2004, pp. 318-321, XP010800518 ISBN:978-0-78038689-1 *figure 4*.

Liang Zhu et al., "A Depth-First Search Algorithm Automatic Initialization Splitting of Snakes", Bioengineering Conference, 2007. NEBC '07. IEEE 33rd Annual Northeast, IEEE, Piscataway, NJ, USA LNKD- DOI:10.1109/NEBC.2007.4413309, Mar. 1, 2007, pp. 122-123,XP031198120, ISBN: 978-1-4244-1032-3.

Chenyang Xu et al., "Gradient Vector Flow: A New External Force for Snakes", Computer Vision and Pattern Recognition, 1997. Proceedings., 1997 IEEE Computer Society Conference on San Juan, Puerto Rico Jun. 17-19, 1997, Los Alamitos, CA, USA, IEEE Comput. Soc, US LNKD- DOI:10.1109/CVPR.1997.609299, Jun. 17, 1997, pp. 66-71, XP010237503 ISBN: 978-0-8186-7822-6.

Nixon M; Aguado A. "Feature Extraction and Image Processing", Jan. 1, 2002, pp. 217-245, XP007919376.

Tinku Acharya and Ajoy K. Ray, "Image Processing:Principles and Applications [Image Processing:Principles and Applications", Wiley-Interscience, Sep. 8, 2005, pp. 194-207, XP007919377.

Bernd Jahne, Horst Haussecker, Peter Geissler, "Handbook of Computer Vision and Applications, vol. 2: Signal Processing and Pattern Recognition", Academic Press 1999, pp. 209-238, 455, 481-484, XP007919467.

Jasjit S. Suri, S. Kamaledin Setarehdan, Sameer Singh, "Advanced Algorithmic Approaches to Medical Image Segmentation: State-of-the-Art Applications in Cardiology, Neurology, Mammography and Pathology", Springer, 2002, pp. 416-439, XP007919378.

Kass et al., Snakes: Active Contour Models, International Journal of Computer Vision, 321-331 (1998), © 1987 Kluwer Academic Publishers, Boston, Manufactured in The Netherlands.

* cited by examiner

FIG.8

VEHICLE PERIPHERY MONITORING DEVICE, VEHICLE PERIPHERY MONITORING PROGRAM, AND VEHICLE PERIPHERY MONITORING METHOD

BACKGROUND OF THE INVENTION

1. Field of the Invention

The present invention relates to a vehicle periphery motoring device which monitors a vehicle periphery by detecting a monitoring object located in a periphery of a vehicle according to a distance information by a radar mounted in the vehicle and a captured image by an imaging unit mounted in the vehicle, and a vehicle periphery monitoring program and a vehicle periphery monitoring method thereof.

2. Description of the Related Art

Conventionally, there has been disclosed a vehicle periphery monitoring device (for example, refer to Japanese Patent Laid-open No. 2006-151125) which includes both a radar and a camera mounted in a vehicle, determines an image area where an image portion of an object is estimated to be present in a captured image by the camera on the basis of a distance detection data by the radar, and performs an image processing in which an image portion of a monitoring object is extracted from the image area (image processing area) serving as a target. device, an area with a spreading in accordance with a beam profile of the radar (a two dimensional spreading in a cross section orthogonal to the transmission direction of the beam) centered at a measuring position where an object is detected to be present is determined as the image processing area according to the distance detection data. By defining the image processing area, it is expected to reduce time needed to perform the image processing thereon shorter than an image processing by extracting an image portion of a monitoring object with respect to the whole captured image by the camera.

However, the beam profile of the radar varies according to the superficial reflection characteristics of an object. Therefore, when an image area is determined for extracting an image portion of a monitoring object on the basis of a distance information of an object detected by the radar, there may have problems such as a part of the image portion of the object may not be included in the image area if the object is difficult to reflect the radar beams.

SUMMARY OF THE INVENTION

The present invention has been accomplished in view of the aforementioned problems, and it is therefore an object of the present invention to provide a vehicle periphery monitoring device, a vehicle periphery monitoring program and a vehicle periphery monitoring method which can set appropriately an image processing area for extracting an image portion of an monitoring object according to a type of the monitoring object.

The present invention is accomplished to attain an object described above, and the vehicle periphery monitoring device according to the present invention is provided with a radar mounted in a vehicle and configured to detect a distance between the vehicle and an object located in a first monitoring range of a periphery of the vehicle and an imaging unit mounted in the vehicle and configured to photograph a second monitoring range overlapped with the first monitoring range, and is configured to monitor the periphery of the vehicle on the basis of a distance information detected by the radar and a captured image by the imaging unit.

A first aspect of the vehicle periphery monitoring device according to the present invention includes an image processing target area setting portion configured to set an image processing target area which may include an image portion of a monitoring object in the captured image on the basis of a distance detected by the radar between an object located in the second monitoring range and the vehicle; a feature region extracting portion configured to extract a feature region having a feature amount defined in accordance with a specified part of the monitoring object of a predefined type in a search area defined on the basis of the image processing target area; an image processing target area correcting portion configured to correct a range of the image processing target area on the basis of a position of the feature region when the feature region is extracted by the feature region extracting portion; and an object type discriminating portion configured to discriminate a type of the monitoring object in a real space corresponding to the image portion included in the image processing target area which has been corrected by the image processing target area correcting portion.

According to the first aspect of the present invention, the image processing target area which may include the image portion of the monitoring object in the captured image is set by the image processing target area setting portion on the basis of the distance detected by the radar between the object located in the second monitoring range and the vehicle. When the feature region is extracted by the feature region extracting portion, the range of the image processing target area is corrected by the image processing target area correcting portion on the basis of the position of the feature region. As described, the range of the image processing target area can be appropriately corrected to include the total or main part of the image portion having the feature amount by correcting the range of the image processing target area on the basis of the position of the feature region. Moreover, by discriminating the type of the monitoring object in a real space corresponding to the image portion included in the corrected image processing target area through the object type discriminating portion, the accuracy for the discrimination of the object type can be improved.

The present invention further includes a data storing portion configured to store an object size data representing a size of the monitoring object of the predefined type, wherein the image processing target area setting portion detects a position corresponding to a contact portion between the object and a road surface in the captured image on the basis of the distance between the vehicle and the object located in the second monitoring range detected by the radar, and sets, as the image processing target area, a range determined by correcting the object size data according to the distance using the distance as a reference.

According to the present invention, the image processing target area can be set by the image processing target area setting portion according to the size of the monitoring object of predefined type located on a road in the second monitoring range. Therefore, by setting the image processing target area as above described, the extraction of the feature region by the feature region extracting portion and the correction of the image processing target area by the image processing target area correcting portion can be performed effectively in accordance with the type of the monitoring object by confining those to the range of the image area serving as the target.

Further, the object type discriminating portion discriminates whether the monitoring object in the real space corresponding to the image portion included in the image processing target area corrected by the image processing target area correcting portion is a pedestrian or not.

According to the present invention, the image processing target area is corrected by the image processing target correcting portion so as to include the total or main part of the image portion of the pedestrian, and whether the monitoring object is the pedestrian or not can be discriminated by the object type discriminating portion.

A second aspect of the present invention includes an image processing target area setting portion configured to set an image processing target area which may include an image portion of a monitoring object in the captured image on the basis of the distance detected by the radar between an object located in the second monitoring range and the vehicle; a luminance distribution calculating portion configured to calculate a luminance distribution of a luminance calculation area defined on the basis of the image processing target area; an image processing target area correcting portion configured to correct a range of the image processing target area on the basis of the luminance distribution calculated by the luminance distribution calculating portion; and an object type discriminating portion configured to discriminate a type of the monitoring object in a real space corresponding to the image portion included in the image processing target area which has been corrected by the image processing target area correcting portion.

According to the present invention, details thereof to be described hereinafter, the position of the image portion included in the luminance calculation area can be recognized according to the luminance distribution in the luminance calculation area defined on the basis of the image processing target area. Therefore, the range of the image processing target area can be corrected by the image processing target correcting portion on the basis of the luminance distribution of the pixel for the luminance calculation area so as to include the total or main part of the image portion of the monitoring object. Thus, by discriminating the type of the monitoring object in a real space corresponding to the image portion included in the corrected image processing target area through the object type discriminating portion, the accuracy for the discrimination of the object type can be improved.

The present invention further includes a data storing portion configured to store an object size data representing a size of the monitoring object of a predefined type, wherein the image processing target area setting portion detects a position corresponding to a contact portion between the object and a road surface in the captured image on the basis of the distance between the vehicle and the object located in the second monitoring range detected by the radar, and sets as the image processing target area a range determined by correcting the object size data according to the distance using the position as a reference.

According to the present invention, the image processing target area can be set by the image processing target area setting portion according to the size of the monitoring object of a predefined type located on a road in the second monitoring range.

Therefore, by setting the image processing target area as above described, the calculation of the luminance distribution by the luminance distribution calculating portion and the correction of the image processing target area by the image processing target area correcting portion can be performed effectively in accordance with the type of the monitoring object by confining those to the range of the image area serving as the target.

The luminance distribution calculating portion calculates a luminance projection in a horizontal direction and a vertical direction, respectively, in the luminance calculating area as the luminance distribution.

Herein, the luminance projection in a horizontal coordinate of the luminance calculating area refers to a distribution behavior of a luminance value summed from each pixel in each horizontal coordinate of the luminance calculating area in the captured image. Similarly, the luminance projection in a vertical coordinate of the luminance calculating area refers to a distribution behavior of a luminance value summed from each pixel in each vertical coordinate of the luminance calculating area in the captured image. Therefore, by using the luminance projection in the horizontal coordinate and the vertical coordinate, respectively, of the luminance calculating area as the luminance distribution of the luminance calculating area, it is possible to recognize easily the total luminance distribution of the luminance calculating area and to detect the position of the image portion located in the luminance calculating area.

The present invention further includes a feature region extracting portion configured to extract a feature region having a feature amount defined in accordance with a specified part of the monitoring object of a predefined type in a search area defined on the basis of the image processing target area corrected by the image processing target area correcting portion, wherein the image processing target area correcting portion configured to further correct a range of the image processing target area on the basis of a position of the feature region when the feature region is extracted by the feature region extracting portion.

According to the present invention, with respect to the image processing target area corrected on the basis of the luminance distribution calculated by the luminance calculating portion, the image processing target area correcting portion further corrects it on the basis of the position of the feature region extracted by the feature region extracting portion. Thereby, even when the feature region is not included in the image processing target area set by the image processing target area setting portion, it is possible to correct the image processing target area so as to include therein the image portion of the monitoring object according to the luminance distribution. With respect to the corrected image processing target area, further correction is performed on the basis of the position of the feature region, thus, it is possible to correct the range of the image processing target area so as to include therein the total or main part of the image portion having the feature amount. Therefore, the accuracy for the discrimination of the object type by the object type discriminating portion can be improved.

The present invention provides a vehicle periphery monitoring program which causes a computer provided with an input portion configured to input a detection signal from a radar mounted in a vehicle and configured to detect a distance between the vehicle and an object located in a first monitoring range of a periphery of the vehicle, and an accessing portion configured to access a captured image from an imaging unit mounted in the vehicle and configured to photograph a second monitoring range overlapped with the first monitoring range, to monitor the periphery of the vehicle on the basis of a distance information detected by the radar and the captured image by the imaging unit.

A first aspect of the vehicle periphery monitoring program of the present invention functions the computer as an image processing target area setting portion configured to set an image processing target area which may include an image portion of a monitoring object in the captured image on the basis of the distance detected by the radar between an object located in the second monitoring range and the vehicle; a feature region extracting portion configured to extract a feature region having a feature amount defined in accordance with a specified part of the monitoring object of a predefined type in a search area defined on the basis of the image processing target area; an image processing target area correcting portion configured to correct a range of the image processing target area on the basis of a position of the feature region when the feature region is extracted by the feature region extracting portion; and an object type discriminating portion configured to discriminate a type of the monitoring object in a real space corresponding to the image portion included in the image processing target area which has been corrected by the image processing target area correcting portion.

By causing the computer to execute the vehicle periphery monitoring program of the present invention, it is possible to constitute the image processing target area setting portion, the feature region extracting portion, the image processing target area correcting portion, and the object type discriminating portion in the vehicle periphery monitoring device of the first aspect described above.

A second aspect of the vehicle periphery monitoring program of the present invention functions the computer as an image processing target area setting portion configured to set an image processing target area which may include an image portion of a monitoring object in the captured image on the basis of the distance detected by the radar between an object located in the second monitoring range and the vehicle; a luminance distribution calculating portion configured to calculate a luminance distribution of a luminance calculation area defined on the basis of the image processing target area; an image processing target area correcting portion configured to correct a range of the image processing target area on the basis of the luminance distribution calculated by the luminance distribution calculating portion; and an object type discriminating portion configured to discriminate a type of the monitoring object in a real space corresponding to the image portion included in the image processing target area which has been corrected by the image processing target area correcting portion.

By causing the computer to execute the vehicle periphery monitoring program of the present invention, it is possible to constitute the image processing target area setting portion, the luminance distribution calculating portion, the image processing target area correcting portion, and the object type discriminating portion in the vehicle periphery monitoring device of the second aspect described above.

The present invention provides a vehicle periphery monitoring method which causes a computer provided with an input portion configured to input a detection signal from a radar mounted in a vehicle and configured to detect a distance between the vehicle and an object located in a first monitoring range of a periphery of the vehicle, and an accessing portion configured to access a captured image from an imaging unit mounted in the vehicle and configured to photograph a second monitoring range overlapped with the first monitoring range, to monitor the periphery of the vehicle on the basis of a distance information by the radar and the captured image by the imaging unit.

A first aspect of the vehicle periphery monitoring method comprises an image processing target area setting step in which the computer sets an image processing target area which may include an image portion of a monitoring object in the captured image on the basis of the distance detected by the radar between an object located in the second monitoring range and the vehicle; a feature region extracting step in which the computer extracts a feature region having a feature amount defined in accordance with a specified part of the monitoring object of a predefined type in a search area defined on the basis of the image processing target area; an image processing target area correcting step in which the computer corrects a range of the image processing target area on the basis of a position of the feature region when the feature region is extracted in the feature region extracting step; and an object type discriminating step in which the computer discriminates a type of the monitoring object in a real space corresponding to the image portion included in the image processing target area which has been corrected in the image processing target area correcting step.

According to the present invention, the image processing target area which may include the image portion of the monitoring object in the captured image is set in image processing target area setting step on the basis of the distance detected by the radar between an object located in the second monitoring range and the vehicle. When the feature region is extracted by the feature amount extracting step, the range of the image processing target area is corrected on the basis of the position of the feature region in the image processing target area correcting step. Thereby, by correcting the image processing target area on the basis of the feature region, the range of the image processing target area can be appropriately corrected to include therein the total or main part of the image portion having the feature amount. Thus, by discriminating the type of the monitoring object in a real space corresponding to the image portion included in the corrected image processing target area through the object type discriminating step, the accuracy for the discrimination of the object type can be improved.

A second aspect of the vehicle periphery monitoring method of the present invention comprises an image processing target area setting step in which the computer sets an image processing target area which may include an image portion of a monitoring object in the captured image on the basis of the distance detected by the radar between an object located in the second monitoring range and the vehicle; a luminance distribution calculating step in which the computer calculates a luminance distribution of a luminance calculation area defined on the basis of the image processing target area; an image processing target area correcting step in which the computer corrects a range of the image processing target area on the basis of the luminance distribution calculated in the luminance distribution calculating step; and an object type discriminating step in which the computer discriminates a type of the monitoring object in a real space corresponding to the image portion included in the image processing target area which has been corrected in the image processing target area correcting step.

According to the present invention, details thereof to be described hereinafter, the position of the image portion included in the luminance calculating area can be recognized according to the luminance distribution in the luminance calculating area defined on the basis of the image processing target area. Thus, the range of the image processing target area can be corrected to include therein the total or main part of the image portion of the monitoring object by the image processing target area correcting step on the basis of the luminance distribution of the luminance calculating area. Therefore, by discriminating the type of the monitoring object in a real space corresponding to the image portion included in the corrected image processing target area through the object type discriminating step, the accuracy for the discrimination of the object type can be improved.

DETAILED DESCRIPTION OF THE PREFERRED EMBODIMENTS

Figure 1:
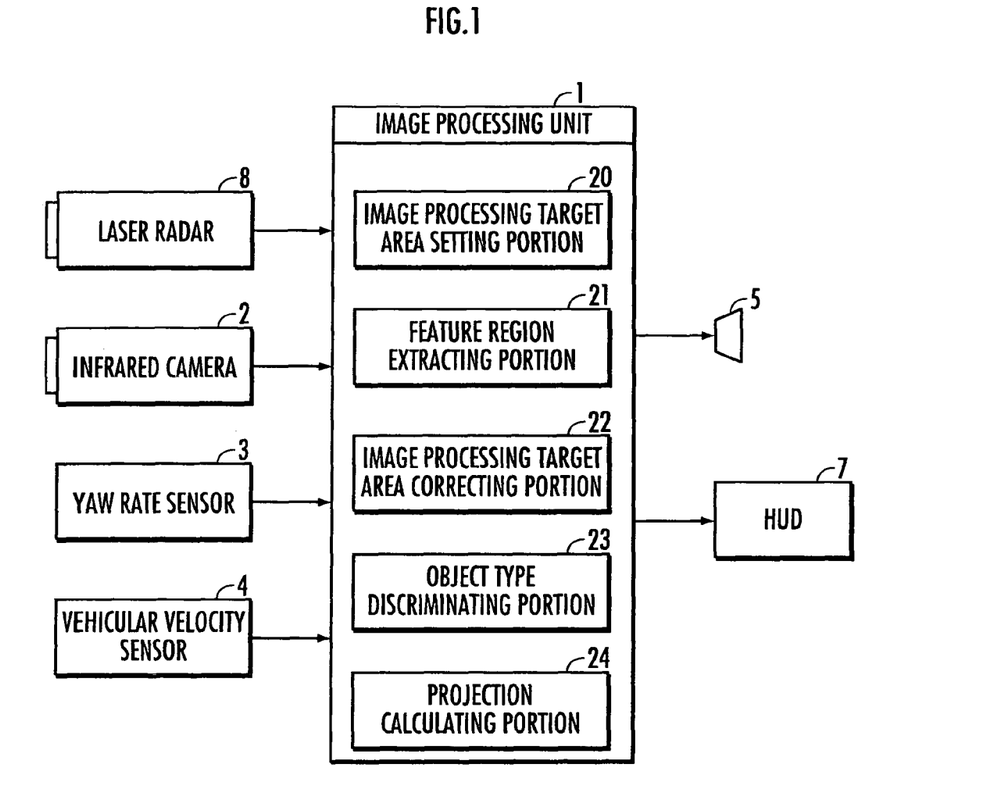
FIG. 1 is a block diagram of a vehicle periphery monitoring device of the present invention.

Hereinafter, an embodiment of the present invention will be described in detail with reference to FIG. 1 to FIG. 9. FIG. 1 is a block diagram of a vehicle periphery monitoring device of the present invention. The vehicle periphery monitoring device of the present invention is provided with an image processing unit 1, an infrared camera capable of detecting far infrared rays (equivalent to an imaging unit of the present invention), a laser radar 8 configured to radiate laser rays on an object and detect a distance between the object and a vehicle (equivalent to a radar of the present invention), a yaw rate sensor 3 configured to detect a yaw rate of the vehicle, and a vehicular velocity sensor 4 configured to detect a driving velocity of the vehicle.

The image processing unit 1 discriminates a type of a monitoring object (a pedestrian, an animal or the like) in front of the vehicle from a captured image by the infrared camera 2, and outputs an alarm when there is a high possibility of contact between the monitoring object and the vehicle. Thereby, the vehicle periphery monitoring device includes a speaker 5 for playing an alarm sound, and a head-up display (hereinafter, referred to as HUD) 7 for displaying visually the monitoring object to a driver.

Figure 2:
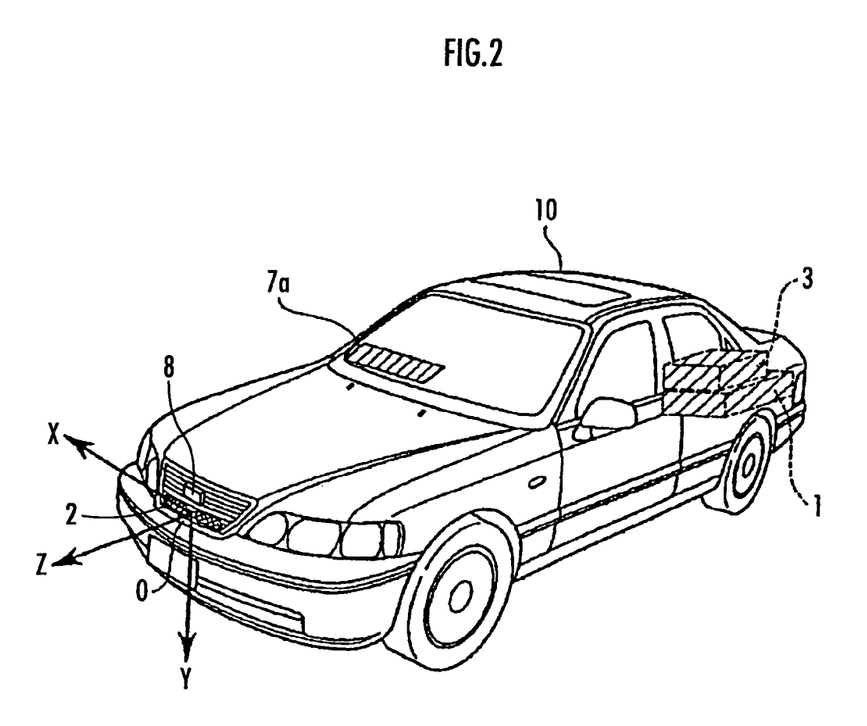
FIG. 2 is an explanatory diagram illustrating an assembled state of the vehicle periphery monitoring device in FIG. 1 to a vehicle.

Hereinafter, with reference to FIG. 2, an assembled state of the vehicle periphery monitoring device to the vehicle will be described. The laser radar 8 is of a scanning type and is disposed in a front portion of the vehicle 10. The laser radar scans a first monitoring range preliminarily set in front (moving direction of the vehicle 10) along a horizontal direction and a vertical direction.

The infrared camera 2 has such a property that when a temperature of a captured object becomes higher, an output level thereof will become higher (a luminance thereof will become greater). The infrared camera 2 is disposed in a front portion of the vehicle 10 and photographs a second monitoring range (defined inside the above-mentioned first monitoring range) preliminarily set in front. The HUD 7 is disposed in a front position of the driver side on a windshield to display thereon a picture area 7a.

The image processing unit 1 includes an image inputting circuit configured to convert an analogue image signal output from the infrared camera 2 to a digital data and introduce it to an image memory, an interface circuit (corresponding to an access portion to a captured image by the imaging portion of the present invention) configured to access (read and write) the image data introduced to the image memory, and an interface circuit (corresponding to an input portion to input a detection signal from the radar of the present invention) configured to input a distance detection signal from the laser radar 8.

The image processing unit 1 is an electronic unit provided with a computer (an arithmetic processing circuit composed of a CPU, a memory, an input circuit, an output circuit and the like, or a micro computer integrated with these functions) or the like which performs various arithmetic computations on the image data introduced into the image memory.

By causing the computer to execute a vehicle periphery monitoring program of the present invention, the computer functions as an image processing target area setting portion 20 configured to set an image processing target area which may include an image portion of a monitoring object in the captured image on the basis of a distance information from the laser radar 8 between an object located in the first monitoring range and the vehicle, a feature region extracting portion 21 configured to extract an image portion having a feature amount for a specified part of a monitoring object of a predefined type as a feature region, a projection calculating portion 24 configured to calculate a luminance projection in a horizontal direction and a vertical direction, an image processing target area correcting portion 22 configured to correct a range of the image processing target area on the basis of a position of the feature region or the luminance projection, and an object type discriminating portion 23 configured to discriminate a type of the monitoring object in a real space corresponding to the image portion included in the corrected image processing target area. In the present embodiment, the object type discriminating portion 23 discriminates whether the monitoring object is a pedestrian or not.

Owning to these portions, an image processing target area setting step, a feature region extracting step, a projection calculating step, an image processing target area correcting step, and an object type discriminating step in a vehicle periphery monitoring method of the present invention are executed.

First Embodiment

A discrimination method for a type of a monitoring object by the image processing unit 1 in a first embodiment of the present will be described hereinafter with reference to a flow chart illustrated in FIG. 3.

First, the image processing unit 1 performs processing in STEP 1, STEP 20 and STEP 30 in parallel. In STEP 1, the image processing unit 1 reads outputs from the vehicular velocity sensor 4 and the yaw rate sensor 3 and calculates a turning angle of the vehicle 10. In STEP 20, the image processing unit 1 is input with a distance measurement data of the first monitoring range from the laser radar 8. In STEP 30, the image processing unit 1 is input with an infrared image from the infrared camera 2.

Subsequently in STEP 2, the image processing unit 1 performs docking of the monitoring object located in the first monitoring range while correcting the turning angle on the basis of the distance measurement data from the laser radar 8. The processing in STEP 3 and the processing in STEP 4 are performed by the image processing target area setting portion 20. The image processing target area setting portion 20 estimates an intersection point between the monitoring object and the road surface in STEP 3, and sets the image processing target area by taking the intersection point as a reference in STEP 4. The process of setting the image processing target area in STEP 4 corresponds to the image processing target area setting step of the present invention.

Figure 4:
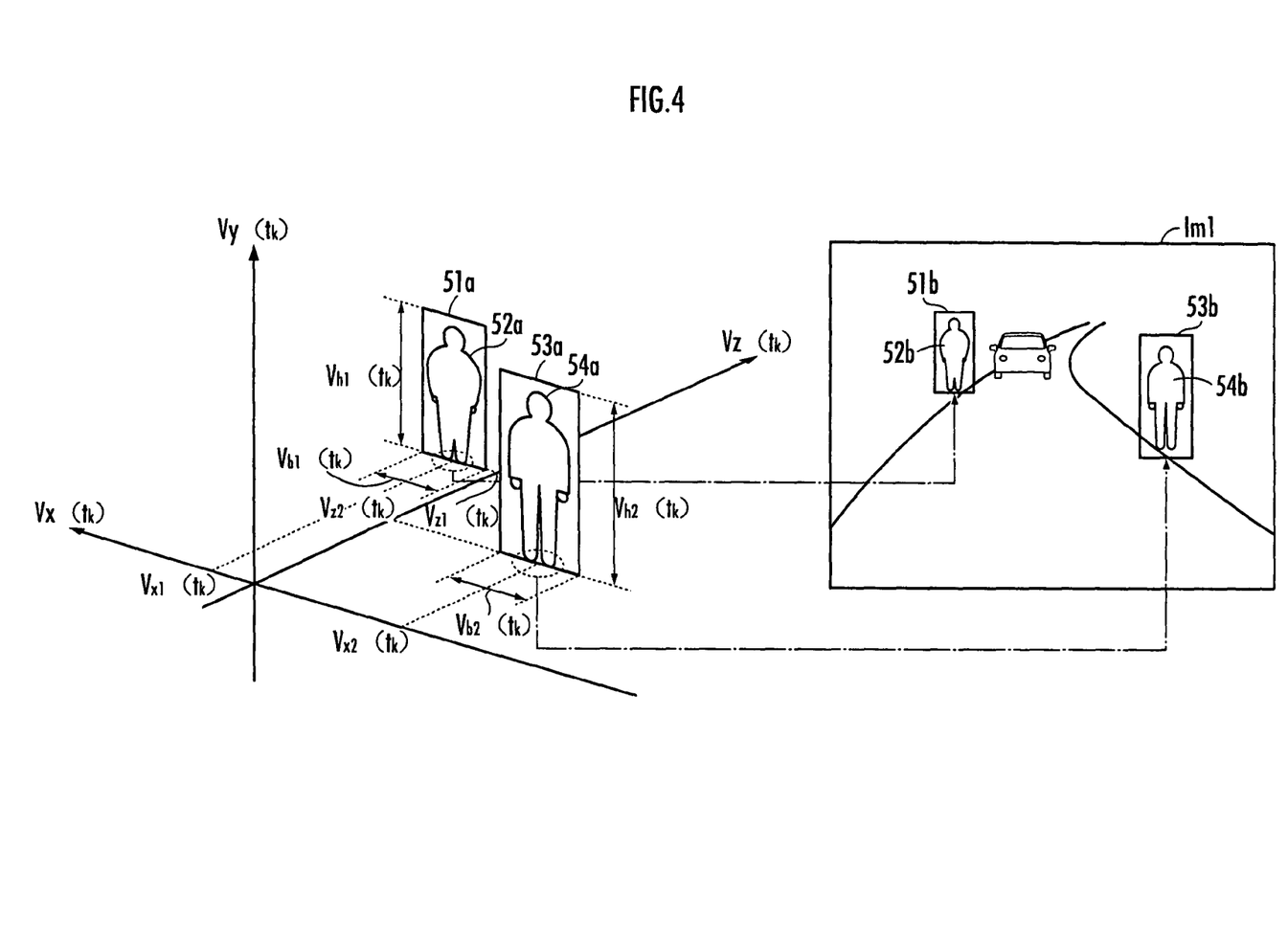
FIG. 4 is an explanatory diagram illustrating a setting processing of an image processing target area on the basis of a distance measurement data of a monitoring object by radar.

FIG. 4 illustrates a method of setting the image processing target area on the infrared image on the basis of the distance measurement data from the laser radar 8 and a physical data of the pedestrian. The left side of FIG. 4 illustrates a situation where the distances to the monitoring objects (pedestrians in the present embodiment) 52a and 54a in front of the vehicle 10 are measured respectively at a timing $t_k$ in a real space having the moving direction of the vehicle 10 as Vz, the vertical direction as Vy and the vehicular width direction as Vx. The right side of FIG. 4 illustrates a captured image Im1 by the infrared camera 2 at the timing $t_k$.

Referring to FIG. 4, the distance $Vz1(t_k)$ between the pedestrian 52a and the vehicle 10, and the distance $Vz2(t_k)$ between the pedestrian 54a and the vehicle 10 are measured. With respect to the pedestrian 52a, the image processing target area setting portion 20 scales the range 51a ($Vb1(t_k) \times Vh1(t_k)$) defined according to the physical data of a pedestrian (which is set relatively greater than a general pedestrian and is pre-stored in a memory (not shown) and corresponds to an object size data of the present invention) with the intersection point between the pedestrian 52a and the road surface as the reference down to the image processing target area 51b on the basis of the distance $Vz1(t_k)$ between the pedestrian 52a and the vehicle 10, and sets it on the captured image Im1.

Similarly, with respect to the pedestrian 54a, the image processing target area setting portion 20 scales the range 53a ($Vb2(t_k) \times Vh2(t_k)$) defined according to the physical data of a pedestrian with the intersection point between the pedestrian 54a and the road surface as the reference down to the image processing target area 53b on the basis of the distance $Vz2(t_k)$ between the pedestrian 54a and the vehicle 10, and sets it on the captured image Im1.

Thereby, by setting the image processing target area 51b for the pedestrian 52a and the image processing target area 53b for the pedestrian 54a on the basis of the physical data of the pedestrians with the intersection point to the road surface as the reference, it is expected that the image processing target area 51b can be set to include the total part of the image portion 52b of the pedestrian 52a and the image processing target area 53b can be set to include the total part of the image portion 54b of the pedestrian 54a.

Figure 5A:
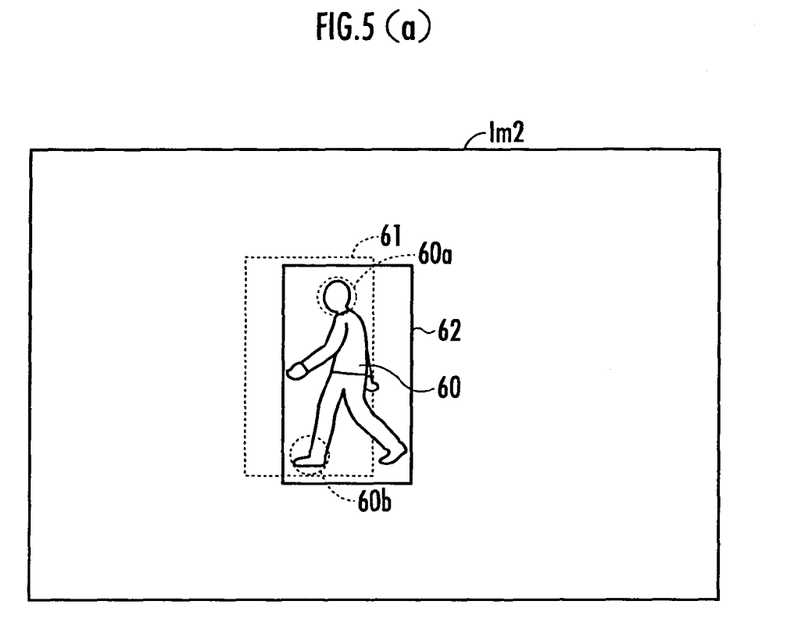
FIG. 5 is an explanatory diagram illustrating a correction processing of a range of the image processing target area on the basis of a position of an image portion of a head.

However, in practical, due to a posture of a pedestrian, a pitching of a vehicle, a resolution power of a radar and the like, the total part of the image portion of the pedestrian may not be included in the image processing target area. Such case is illustrated by FIG. 5(a). In FIG. 5(a), from the image processing target area 61 set with the ground contacting portion 60b between the image portion 60 of the pedestrian and the road surface as the reference, a part of the image portion of the pedestrian (one foot) is protruding out.

Figure 6A:
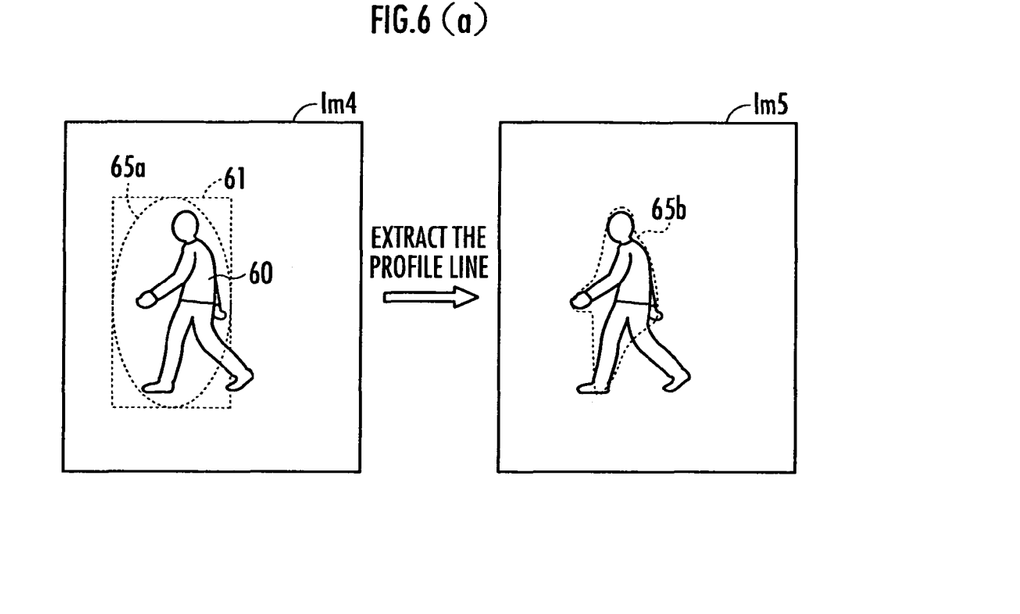
FIG. 6 is an explanatory diagram illustrating an extraction of a profile line for the image portion after correcting the range of the image processing target area.

FIG. 6(a) illustrates such a case that a profile line extracting processing is performed in STEP 7 and STEP 8 (to be described later) with respect to the image processing target area 61 in which the total part of the image portion 60 of the pedestrian is not included. In this case, the shape of a profile line 65b of the image Im5 extracted from an initial elliptical profile line 65a set for the image processing target area 61 in the image Im4 deviates from the preliminarily defined shape for discriminating a pedestrian, thus, it becomes impossible to determine that an object in the real space corresponding to the image portion 60 is a pedestrian.

Figure 5B:
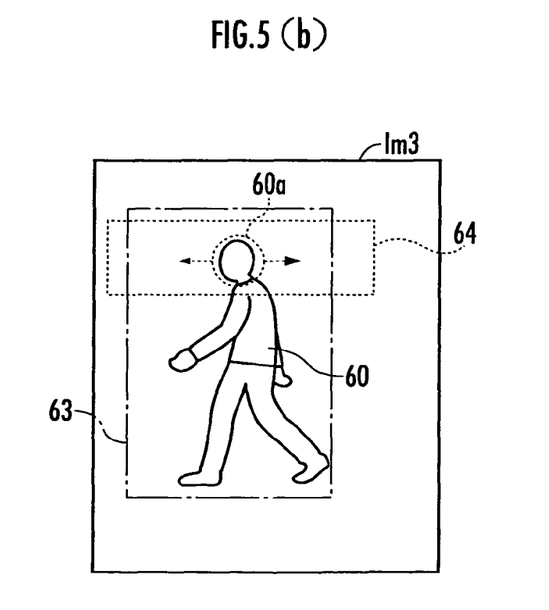

In this regard, the image processing unit 1 extracts a feature region 60a from the image portion 60 and corrects the range of the image processing target area 61 through STEP 5 to STEP 6, as illustrated in FIG. 5(a) and FIG. 5(b). The process of extracting the feature region in STEP 5 corresponds to the feature region extracting step of the present invention, and the process of correcting the image processing target area in STEP 6 corresponds to the image processing target area correcting step of the present invention.

The processing in STEP 5 is performed by the feature region extracting portion 21. The feature region extracting portion 21 extracts the feature region having a feature amount set in accordance with a head (corresponding to the specified part of the present invention) of the pedestrian, which is the monitoring object of the present embodiment, from a search area 64 which is set by enlarging the upper portion of the image processing target area 61 along the horizontal coordinate direction (the lateral direction of the drawing). Specifically, the feature region extracting portion 21 extracts the feature region 60a from a partial image of the image processing target area 61, using a total number of edge pixels in a circumference of a model circle having a size deduced from a body height of a pedestrian (for example, having a diameter equal to 1/14 of the body height of the pedestrian) and edge pixels in a range of the circumference ±1 pixel as the feature amount.

The processing in STEP 6 is performed by the image processing target area correcting portion 22. As illustrated in FIG. 5(a), the image processing target area correcting portion 22 corrects the range of the image processing target area 61 to 62, using the position of the image portion 60a of the head which is featured by the feature region extracting portion 21 as a reference. Specifically, the image processing target area correcting portion 22 performs corrections so as to locate the image portion 60a of the head close to the central point of the image processing target area 62 in the horizontal direction and locate the image portion 60a of the head close to the upper end of the image processing target area 62 in the vertical direction. According thereto, the image portion 60a of the pedestrian can be included in the corrected image processing target area 62.

Figure 6B:
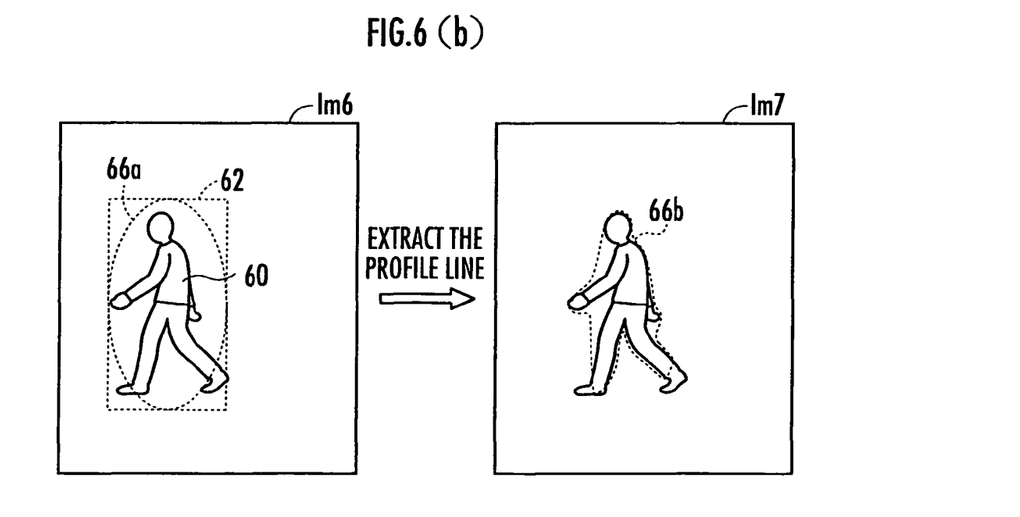

The processing in STEP 7 to STEP 9 is performed by the object type discriminating portion 23. As illustrated in FIG. 6(b), the object type discriminating portion 23 sets an initial elliptical profile line 66a inside the image processing target area 62 in STEP 7, converges the initial elliptical profile line 66a and extracts a profile line 66b of the image portion 60 in STEP 8. The extraction of the profile line 66b is performed by using a dynamic profile detection method which is publicly known, such as Snakes and the like.

Thereafter, in STEP 9, the object type discriminating portion 23 discriminates whether the monitoring object in the real space corresponding to the image portion 66 is a pedestrian or not according to the shape of the extracted profile line 66b. The processing in STEP 7 to STEP 9 where whether the monitoring object is a pedestrian or not is discriminated corresponds to the object type discriminating step of the present invention.

If the monitoring object in the real space corresponding to the image portion 66 is discriminated to be a pedestrian, the image processing unit 1 emphasizes the position of the image portion 66, displays it on HUD 7, and outputs an attention-attracting audio sound through the speaker 5.

Second Embodiment

Figure 7:
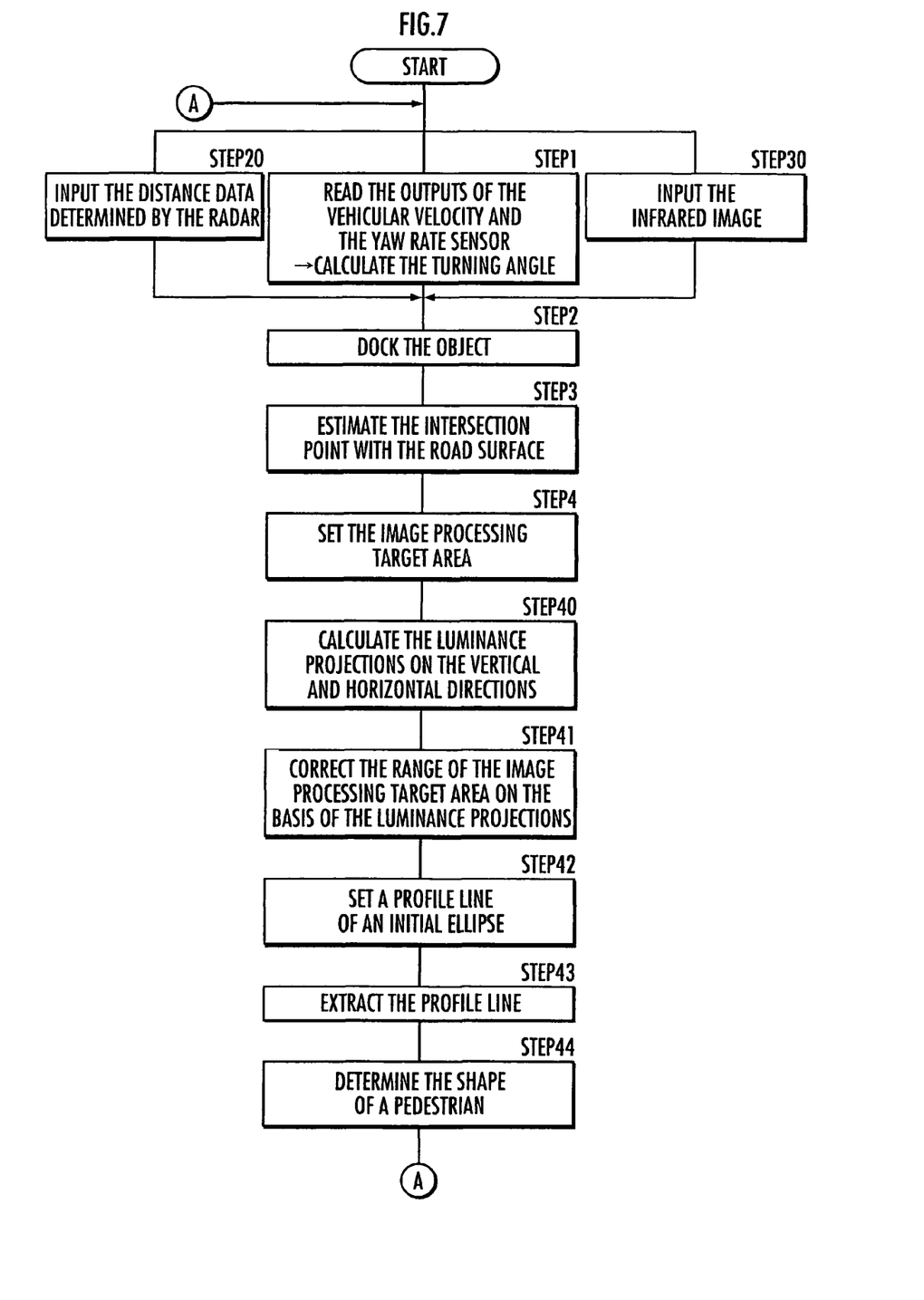
FIG. 7 is a flow chart illustrating a pedestrian discriminating process in a second embodiment of the present invention.

A discrimination method for a type of a monitoring object by the image processing unit 1 in a second embodiment of the present will be described hereinafter with reference to a flow chart illustrated in FIG. 7. STEP 1 to STEP 4, STEP 20 and STEP 30 in FIG. 7 are identical to those in FIG. 3, the descriptions thereof are omitted.

Figure 8:
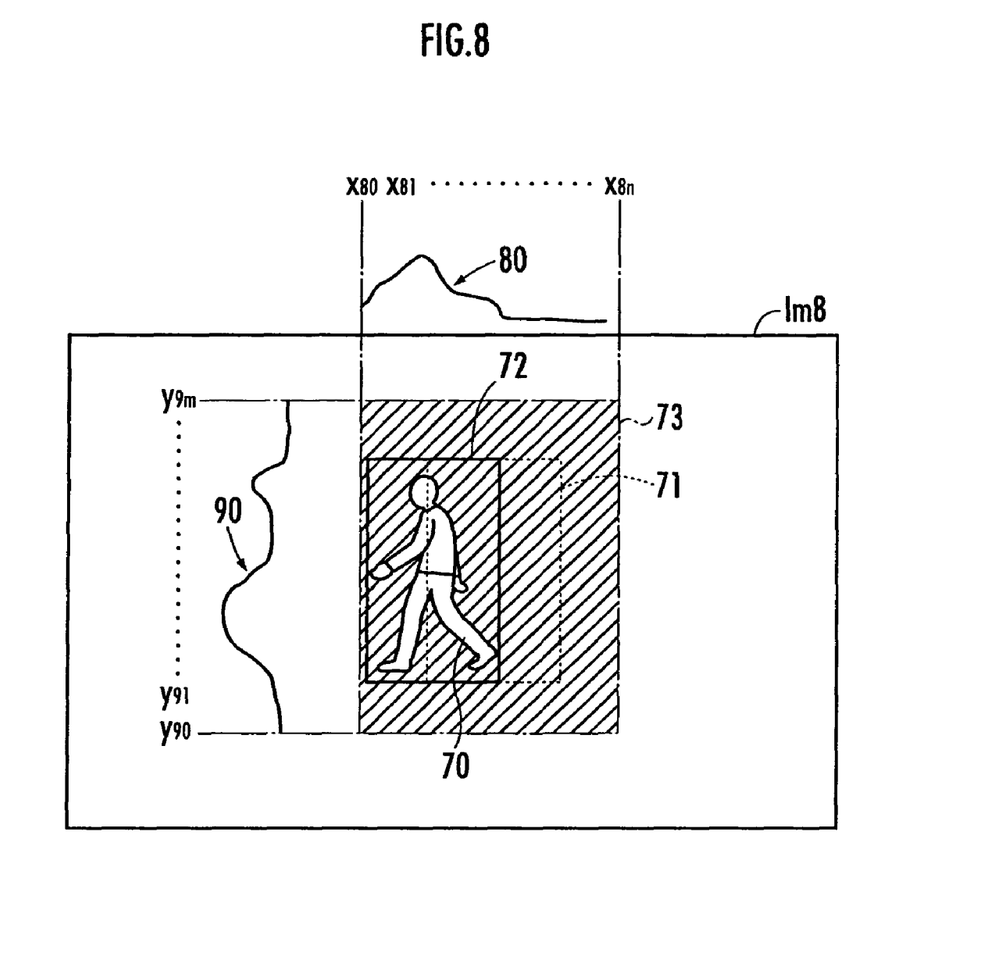
FIG. 8 is an explanatory diagram illustrating a correction processing of a range of the image processing target area on the basis of a luminance projection.

The processing in STEP 40 is performed by the projection calculating portion 24. As illustrated in FIG. 8, the projection calculating portion 24 sets a luminance calculating area 73 which includes therein the image processing target area 71 and is wider than the image processing target area 71 on the basis of the image processing target area 71 in the image Im8 set by the image processing target area setting portion 20 in STEP 4.

The projection calculating portion 24 calculates a luminance projection 80 in the horizontal direction and a luminance projection 81 in the vertical direction of the luminance calculating area 73. Herein, the luminance projection in the horizontal direction is calculated by adding up the luminance value of each pixel for each horizontal coordinate $x_{80}$, $x_{81}, \ldots, x_{8n}$ of the luminance calculating area 73. For example, for $x_{80}$, the luminance values of $(x_{90}, y_{90})$ $(x_{80}, y_{91}), \ldots, (x_{80}, y_{9m})$ are added up.

Further, the luminance projection in the vertical direction is calculated by adding up the luminance value of each pixel for each vertical coordinate $y_{90}, y_{91}, \ldots, y_9n$ of the luminance calculating area 73. For example, for $y_{90}$, the luminance values of $(x_{80}, y_{90}), (x_{81}, y_{90}), \ldots, (x_{8n}, y_{90})$ are added up. The process of calculating the luminance projections in the horizontal direction and the vertical direction in STEP 40 corresponds to the projection calculating step of the present invention.

The processing in the subsequent STEP 41 is performed by the image processing target area correcting portion 22. The image processing target area correcting portion 22 corrects the range of the image processing target area from 71 to 72 according to the luminance projections in the horizontal direction and the vertical direction so that the summed luminance value is included in a greater range of vertical and horizontal coordinates. According thereto, the image portion 70 can be included in the corrected image processing target area 72. The process of correcting the range of the image processing target area in STEP 41 corresponds to the image processing target area correcting step of the present invention.

Figure 3:
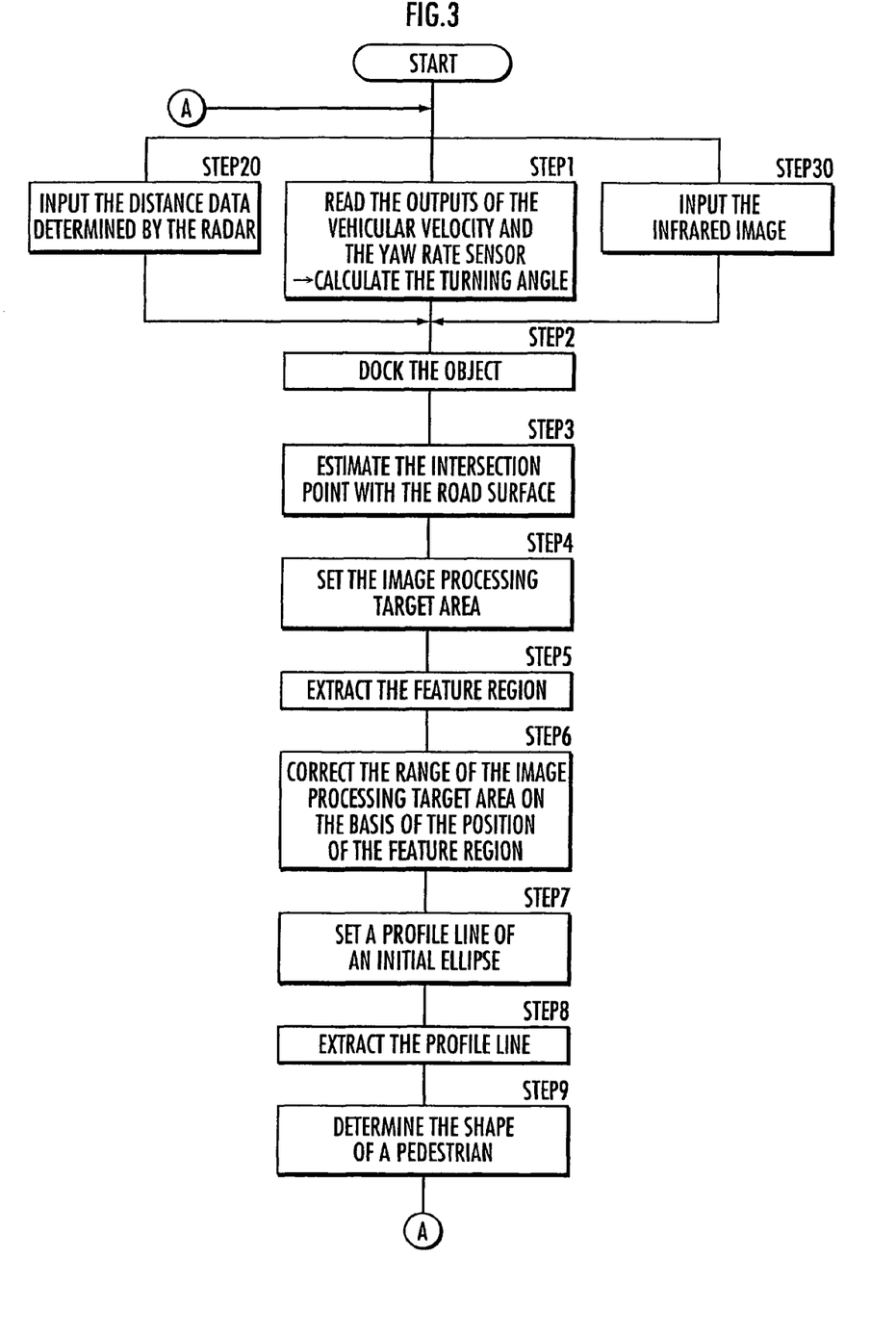
FIG. 3 is a flow chart illustrating a pedestrian discriminating process in a first embodiment of the present invention.

The processing in the subsequent STEP 42 to STEP 44 is identical to that performed in STEP 7 to STEP 9 of FIG. 3, in which the profile line of the image portion 70 included in the corrected image processing target area 72 is extracted and whether the monitoring object in the real space corresponding to the image portion 70 is a pedestrian or not is discriminated by the object type discriminating portion 23. The process of discriminating whether the monitoring object is a pedestrian or not in STEP 42 to STEP 44 corresponds to the object type discriminating step of the present invention.

In the second embodiment, the luminance projections for a horizontal coordinate and a vertical coordinate are calculated as the luminance distribution of the present invention. As another embodiment, it is acceptable to divide the luminance calculating area into a plurality of sub-areas, and calculate an index value by adding up or averaging the luminance values of pixels in each sub-area as the luminance distribution, for example.

Third Embodiment

Figure 9:
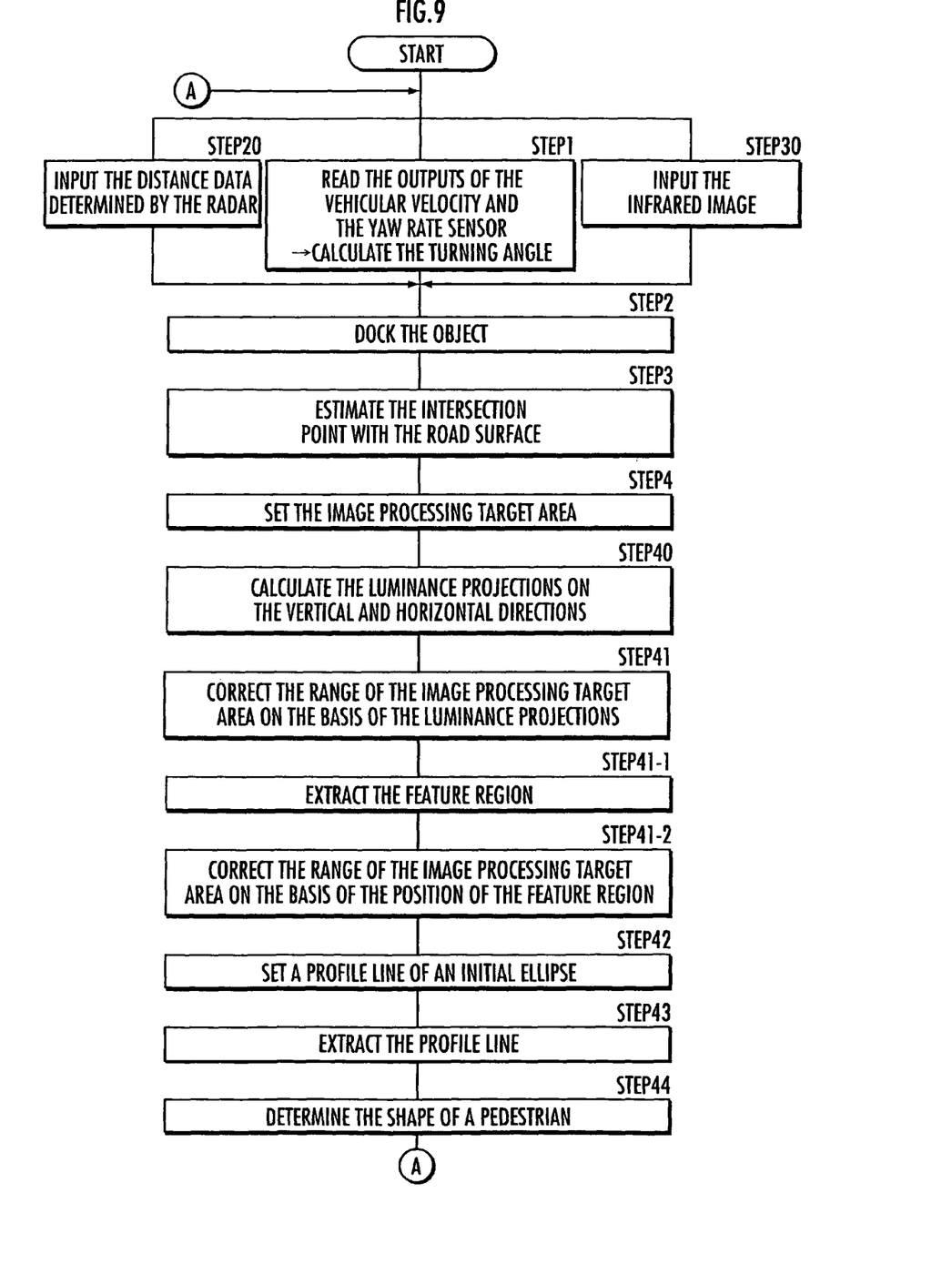
FIG. 9 is a flow chart illustrating a pedestrian discriminating process in a third embodiment of the present invention.

A discrimination method for a type of a monitoring object by the image processing unit 1 in a third embodiment of the present will be described hereinafter with reference to a flow chart illustrated in FIG. 9. STEP 1 to STEP 4, STEP 20, STEP 30, STEP 40, and STEP 42 to STEP 44 in FIG. 9 are identical to those in FIG. 7 mentioned above, the descriptions thereof are omitted.

In the third embodiment, as above-mentioned, after the image processing target area correcting portion 22 corrects the range of the image processing target area on the basis of the luminance projections in the horizontal and vertical directions, the processing of STEP 41-1 and the processing of STEP 41-2 are performed.

The processing in STEP 41-1 is identical to that in STEP 5 of FIG. 3 described above, in which the feature region extracting portion 21 extracts the feature region having the feature amount set in accordance with the head of the pedestrian from the search area. The processing in STEP 41-2 is identical to that in STEP 6 of FIG. 3 described above, in which the image processing target area correcting portion 22 corrects the range of the image processing target area on the basis of the position of the feature region (the image portion of the head of the pedestrian).

Thus, firstly, by correcting the range of the image processing target area on the basis of the luminance projections in the horizontal and vertical directions according to STEP 40 and STEP 41, even when the feature region is not included in the image processing target area set in STEP 4, the correction of the image processing target area can be performed.

Thereafter, the image processing target area can be set in accordance with the shape of the monitoring object by limiting the type of the monitoring object (pedestrian in the present embodiment) through correcting the range of the image processing target area on the basis of the position of the feature region according to the processing in STEP 41-1 and STEP 41-2.

In the present embodiment, the specified type described in the present invention is a pedestrian. However, the present invention is applicable in such a case that whether an object in a real space corresponding to an image portion included in a captured image is a monitoring object of a specified type or not is discriminated when a large sized animal, another vehicle or the like is set as the specified type.

In the present embodiment, the object type discriminating portion 23 is configured to discriminate the type of the monitoring object by extracting the profile line in the corrected image processing target area. However, it is acceptable for it to discriminate the type of the monitoring object according to a pattern matching processing with a pre-registered comparison pattern, an extraction processing of a feature amount, such as the center of gravity, an area, an aspect ratio or the like, of an image portion without performing the extraction of the profile line.

In the present embodiment, as illustrated in FIG. 4, the intersection point between the object and the road surface is detected from the distance measurement data by the laser radar 8, and the image processing target areas 51b and 53b are set on the basis of the intersection point and the physical data. However, it is acceptable to set the image processing target area directly from the distance measurement data by the laser radar 8 without depending on the intersection point and the physical data.

In the present embodiment, the infrared camera 2 is used as the imaging unit of the present invention. However, it is also acceptable to use a normal camera capable of detecting visible light as the imaging unit.

In the present embodiment, the present invention is configured to image the front side of the vehicle. However, it is acceptable to image another direction, such as the rear side, the lateral side or the like, and judge the contact probability to the monitoring object.

INDUSTRIAL APPLICABILITY

As above-mentioned, the present invention can set appropriately an image processing target area for extracting an image portion of a monitoring object in accordance with a type of the monitoring object in a captured image of a front side of a vehicle. Therefore, it is useful in monitoring a periphery of the vehicle.

What is claimed is:

1. A vehicle periphery monitoring device which is provided with a radar mounted in a vehicle and configured to detect a distance between the vehicle and an object located in a first monitoring range of a periphery of the vehicle and an imaging unit mounted in the vehicle and configured to photograph a second monitoring range overlapped with the first monitoring range, and is configured to monitor the periphery of the vehicle on the basis of a distance information detected by the radar and a captured image by the imaging unit, comprising:
    an image processing target area setting portion configured to set an image processing target area which may include an image portion of a monitoring object in the captured image on the basis of the distance detected by the radar between an object located in the second monitoring range and the vehicle;
    a feature region extracting portion configured to extract a feature region having a feature amount defined in accordance with a specified part of the monitoring object of a predefined type in a search area defined on the basis of the image processing target area;
    an image processing target area correcting portion configured to correct a range of the image processing target area on the basis of a position of the feature region when the feature region is extracted by the feature region extracting portion; and
    an object type discriminating portion configured to discriminate a type of the monitoring object in a real space corresponding to the image portion included in the image processing target area which has been corrected by the image processing target area correcting portion.

2. The vehicle periphery monitoring device according to claim 1, further includes a data storing portion configured to store an object size data representing a size of the monitoring object of the predefined type, wherein
    the image processing target area setting portion detects a position corresponding to a contact portion between the object and a road surface in the captured image on the basis of the distance detected by the radar between the vehicle and the object located in the second monitoring range, and sets as the image processing target area a range determined by correcting the object size data according to the distance using the position as a reference.

3. The vehicle periphery monitoring device according to claim 1, wherein
    the predefined type is a pedestrian;
    the specified part is a head of the pedestrian; and
    the object type discriminating portion discriminates whether the monitoring object in the real space corresponding to the image portion included in the image processing target area corrected by the image processing target area correcting portion is the pedestrian or not.

4. A vehicle periphery monitoring device which is provided with a radar mounted in a vehicle and configured to detect a distance between the vehicle and an object located in a first monitoring range of a periphery of the vehicle and an imaging unit mounted in the vehicle and configured to photograph a second monitoring range overlapped with the first monitoring range, and is configured to monitor the periphery of the vehicle on the basis of a distance information detected by the radar and a captured image by the imaging unit, comprising:
    an image processing target area setting portion configured to set an image processing target area which may include an image portion of a monitoring object in the captured image on the basis of the distance detected by the radar between an object located in the second monitoring range and the vehicle;
    a luminance distribution calculating portion configured to calculate a luminance distribution of a luminance calculation area defined on the basis of the image processing target area;
    an image processing target area correcting portion configured to correct a range of the image processing target area on the basis of the luminance distribution calculated by the luminance distribution calculating portion; and
    an object type discriminating portion configured to discriminate a type of the monitoring object in a real space corresponding to the image portion included in the image processing target area which has been corrected by the image processing target area correcting portion.

5. The vehicle periphery monitoring device according to claim 4, further includes a data storing portion configured to store an object size data representing a size of the monitoring object of a predefined type, wherein
    the image processing target area setting portion detects a position corresponding to a contact portion between the object and a road surface in the captured image on the basis of the distance detected by the radar between the vehicle and the object located in the second monitoring range, and sets as the image processing target area a range determined by correcting the object size data according to the distance using the position as a reference.

6. The vehicle periphery monitoring device according to claim 4, wherein the luminance distribution calculating portion calculates a luminance projection in a horizontal direction and a vertical direction, respectively, in the luminance calculating area as the luminance distribution.

7. The vehicle periphery monitoring device according to claim 4, further includes a feature region extracting portion configured to extract a feature region having a feature amount defined in accordance with a specified part of the monitoring object of a predefined type in a search area defined on the basis of the image processing target area corrected by the image processing target area correcting portion, wherein
    the image processing target area correcting portion configured to further correct a range of the image processing target area on the basis of a position of the feature region when the feature region is extracted by the feature region extracting portion.

8. A vehicle periphery monitoring program stored on a non-transitory computer readable medium which causes a computer provided with an input portion configured to input a detection signal from a radar mounted in a vehicle and configured to detect a distance between the vehicle and an object located in a first monitoring range of a periphery of the vehicle, and an accessing portion configured to access a captured image from an imaging unit mounted in the vehicle and configured to photograph a second monitoring range overlapped with the first monitoring range, to monitor the periphery of the vehicle on the basis of a distance information detected by the radar and the captured image by the imaging unit, functioning the computer as:
    an image processing target area setting portion configured to set an image processing target area which may include an image portion of a monitoring object in the captured image on the basis of the distance detected by the radar between an object located in the second monitoring range and the vehicle;

a feature region extracting portion configured to extract a feature region having a feature amount defined in accordance with a specified part of the monitoring object of a predefined type in a search area defined on the basis of the image processing target area;

an image processing target area correcting portion configured to correct a range of the image processing target area on the basis of a position of the feature region when the feature region is extracted by the feature region extracting portion; and an object type discriminating portion configured to discriminate a type of the monitoring object in a real space corresponding to the image portion included in the image processing target area which has been corrected by the image processing target area correcting portion.

9. A vehicle periphery monitoring stored on a non-transitory computer readable medium program which causes a computer provided with an input portion configured to input a detection signal from a radar mounted in a vehicle and configured to detect a distance between the vehicle and an object located in a first monitoring range of a periphery of the vehicle, and an accessing portion configured to access a captured image from an imaging unit mounted in the vehicle and configured to photograph a second monitoring range overlapped with the first monitoring range, to monitor the periphery of the vehicle on the basis of a distance information detected by the radar and the captured image by the imaging unit, functioning the computer as:

an image processing target area setting portion configured to set an image processing target area which may include an image portion of a monitoring object in the captured image on the basis of the distance detected by the radar between an object located in the second monitoring range and the vehicle;

a luminance distribution calculating portion configured to calculate a luminance distribution of a luminance calculation area defined on the basis of the image processing target area;

an image processing target area correcting portion configured to correct a range of the image processing target area on the basis of the luminance distribution calculated by the luminance distribution calculating portion; and an object type discriminating portion configured to discriminate a type of the monitoring object in a real space corresponding to the image portion included in the image processing target area which has been corrected by the image processing target area correcting portion.

10. A vehicle periphery monitoring method which causes a computer provided with an input portion configured to input a detection signal from a radar mounted in a vehicle and configured to detect a distance between the vehicle and an object located in a first monitoring range of a periphery of the vehicle, and an accessing portion configured to access a captured image from an imaging unit mounted in the vehicle and configured to photograph a second monitoring range overlapped with the first monitoring range, to monitor the periphery of the vehicle on the basis of a distance information detected by the radar and the captured image by the imaging unit, comprising steps of:

an image processing target area setting step in which the computer sets an image processing target area which may include an image portion of a monitoring object in the captured image on the basis of the distance detected by the radar between an object located in the second monitoring range and the vehicle;

a feature region extracting step in which the computer extracts a feature region having a feature amount defined in accordance with a specified part of the monitoring object of a predefined type in a search area defined on the basis of the image processing target area;

an image processing target area correcting step in which the computer corrects a range of the image processing target area on the basis of a position of the feature region when the feature region is extracted in the feature region extracting step; and an object type discriminating step in which the computer discriminates a type of the monitoring object in a real space corresponding to the image portion included in the image processing target area which has been corrected in the image processing target area correcting step.

11. A vehicle periphery monitoring method which causes a computer provided with an input portion configured to input a detection signal from a radar mounted in a vehicle and configured to detect a distance between the vehicle and an object located in a first monitoring range of a periphery of the vehicle, and an accessing portion configured to access a captured image from an imaging unit mounted in the vehicle and configured to photograph a second monitoring range overlapped with the first monitoring range, to monitor the periphery of the vehicle on the basis of a distance information detected by the radar and the captured image by the imaging unit, comprising steps of:

an image processing target area setting step in which the computer sets an image processing target area which may include an image portion of a monitoring object in the captured image on the basis of the distance detected by the radar between an object located in the second monitoring range and the vehicle;

a luminance distribution calculating step in which the computer calculates a luminance distribution of a luminance calculation area defined on the basis of the image processing target area;

an image processing target area correcting step in which the computer corrects a range of the image processing target area on the basis of the luminance distribution calculated in the luminance distribution calculating step; and an object type discriminating step in which the computer discriminates a type of the monitoring object in a real space corresponding to the image portion included in the image processing target area which has been corrected in the image processing target area correcting step.

* * * * *